United States Patent [19]
Zvosec et al.

[11] Patent Number: 5,202,090
[45] Date of Patent: Apr. 13, 1993

[54] APPARATUS FOR CERAMIC REPAIR

[75] Inventors: Charles M. Zvosec, Lorain, Ohio; Léon P. Mottet, Nalinnes, Belgium

[73] Assignees: Glaverbel, Brussels, Belgium; Fosbel, Inc., Cleveland, Ohio

[21] Appl. No.: 798,884

[22] Filed: Nov. 27, 1991

Related U.S. Application Data

[62] Division of Ser. No. 343,650, Apr. 28, 1989.

[30] Foreign Application Priority Data

Jul. 26, 1988 [GB] United Kingdom ................ 8817764

[51] Int. Cl.⁵ .................................................. C21B 7/04
[52] U.S. Cl. ........................................ 266/281; 264/30
[58] Field of Search .................... 266/280, 281; 264/30

[56] References Cited

U.S. PATENT DOCUMENTS

| | | | |
|---|---|---|---|
| 2,904,449 | 9/1959 | Bradstreet | 117/46 |
| 3,684,560 | 8/1972 | Brichard et al. | 117/105.1 |
| 3,800,983 | 4/1974 | Brichard et al. | 222/52 |
| 4,192,460 | 3/1980 | Matsuo | 239/79 |
| 4,487,397 | 12/1984 | Antonov et al. | 266/44 |
| 4,489,022 | 12/1984 | Robyn et al. | 264/30 |
| 4,634,611 | 1/1987 | Browning | 427/423 |
| 5,013,499 | 5/1991 | Willard | 266/281 |

FOREIGN PATENT DOCUMENTS

| | | |
|---|---|---|
| 0274286 | 7/1988 | European Pat. Off. |
| 991046 | 5/1965 | United Kingdom |
| 1151423 | 5/1969 | United Kingdom |
| 1330894 | 9/1973 | United Kingdom |
| 2035524 | 6/1980 | United Kingdom |
| 2103959 | 3/1983 | United Kingdom |
| 2173715 | 10/1986 | United Kingdom |
| 2180047 | 3/1987 | United Kingdom |

*Primary Examiner*—Scott Kastler
*Attorney, Agent, or Firm*—Spencer, Frank & Schneider

[57] ABSTRACT

Apparatus for repairing a refractory body, such as a furnace wall by projecting combustible particles in an oxygen-rich carrier gas against such body to cause oxidation of combustible particles in a reaction zone adjacent such body and thereby the generation of heat required for dressing such body or forming a refractory weld mass thereon, wherein the combustible particles are introduced into a first gas and oxygen-rich gas is forced through an entrainment zone 6 in which it produces an aspirating effect whereby a flow of combustible particles and first gas is induced into the entrainment zone 6 and the induced flow of combustible particles and first gas is carried along a conduit 9 and a lance 21 with the oxygen-rich gas to the reaction zone.

19 Claims, 2 Drawing Sheets

APPARATUS FOR CERAMIC REPAIR

This is a division of Ser. No. 07/343,650 filed Apr. 28, 1989.

BACKGROUND OF THE INVENTION

1. Field of the Invention

This invention relates to a process of repairing a refractory body which process involves the step of projecting combustible particles in an oxygen-rich carrier gas against such body to cause oxidation of combustible particles in a reaction zone adjacent such body and thereby the generation of heat required for dressing such body or forming a refractory weld mass thereon.

The invention also relates to apparatus for use in carrying out such a process.

2. Description of the Related Art

The process may be of the type known as ceramic welding, in which refractory material is applied to a refractory substrate to form a coating thereon or to fill holes or fissures in its structure, or ceramic dressing, in which blocks or other forms of ceramic are shaped or cleaned by a cutting action.

Ceramic welding is a particularly important category of process falling within the invention. It is widely employed for repairing furnace linings in situ and has the advantage that durable refractory deposits can be formed at high furnace lining temperatures. Consequently repairs can be effected either without interrupting the furnace operation or with relatively short term interruption of its operation, depending on the type of the furnace and the position in the furnace where the repair is required.

The art of refractory mass formation by ceramic welding has been the subject of a lot of research and development work over the last two decades with a view to the attainment of ever higher qualities and reliabilities of the formed refractory deposits and with a view to utilising the welding technique for welding many different types of refractory composition and making it compatible with an increasing variety of operating parameters.

A particularly significant discovery, which heralded the birth of ceramic welding as a viable industrial process, was the importance of using oxidisable particles of an extremely small average grain size. Processes based on this discovery are disclosed in GB Patent 1 330 894.

The research and development work referred to has in part been concerned with the maintenance of a continuous feed of welding powder into a gas stream. The attainment of a consistently reliable feed of particulate material at a required feed rate involves various problems. Various means for solving these problems have been proposed, see e.g. GB Patent 2 173 715 and 2 103 959.

The handling of very fine easily oxidisable particles, e.g. particles of silicon or aluminium which are most often used as solid fuel constituents of ceramic welding or dressing powder, is attended by certain hazards. For example premature ignition or explosions can occur as a result of localised heating or electrical discharges due to friction in a particle feed line.

In ceramic repair processes there is frequently a need for rapid operations. This requires a high particle feed rate and high concentration of oxygen at the reaction zone. With increasing particle feed rates and oxygen concentrations however the risk of such hazards tends to increase. Notably hazardous conditions can occur when attempting to achieve a high feed rate of easily oxidisable particles directly into an oxygen-rich gas stream. The risk of premature ignition at the region where the particles encounter the oxygen-rich gas stream may be contributed to by mechanical forces.

It is important for the particle feed system for a ceramic repair process to be designed to reduce the risk of such accidents occurring where the particles are transferred from the powder store into an entraining gas stream.

In order to reduce accident risks, it has been proposed to avoid the use of oxygen-rich gas for entraining oxidisable particles from a store to a welding lance and to supply oxygen to the welding lance via a separate feed line (cf GB 2 035 524 and GB 2 180 047). In these proposals air and/or inert gas is used for entraining the particles from the store. A disadvantage of these proposals is the fact that for a given particle feed rate the larger the volume flow rate of the gas used for entraining the particles from the store, the lower the oxygen concentration at the reaction zone. The adoption of such proposed feed systems is therefore not conducive to the attainment of high particle feed rates and volume rates of formation of the refractory deposit. In the market for furnace repair work there is an important demand for a reduction in the time required for completion of this work and this demand cannot be satisfied when using the said previously proposed feed systems.

SUMMARY OF THE INVENTION

The present invention aims to provide a particle feed system which enables a reliable and well controlled feed of particles into a entraining gas stream to be maintained and which can be used for feeding relatively large amounts of oxidisable particles per unit time into an oxygen-rich gas stream without or with relatively small risk of premature ignition.

According to the present invention there is provided a process of repairing a refractory body which process involves the step of projecting combustible particles in an oxygen enriched carrier gas against such body to cause oxidation of combustible particles in a reaction zone adjacent such body and thereby the generation of heat required for dressing such body or forming a refractory weld mass thereon, characterised in that the combustible particles are introduced into a first gas and in that an oxygen-rich gas is forced through an entrainment zone in which it produces an aspirating effect whereby a flow of combustible particles and first gas is aspirated into the entrainment zone and the induced combustible particles and first gas are carried along with said oxygen-rich gas to said reaction zone.

We have found that by adopting the particle introduction system of the present invention it is possible to achieve a high rate of delivery of combustible particles into an oxygen-rich carrier stream, with a reduced risk of problems associated with prior systems.

The invention is thus remarkably effective in balancing the twin requirements of high speed of operation and high safety levels. By introducing the particles into the oxygen-rich gas after they have been introduced into a first gas it has been found to permit a high level of aspiration of particles into the stream. Moreover the rate of aspiration is a steady rate: problems caused by fluctuations in particle feed which have arisen hitherto in feeding the particles as a free-flowing solid mass are reduced. This also means that the comburent carrier gas can be loaded throughout the operation to an increased particle carrying capacity, thus giving increased deposition of refractory mass on the desired surface. At the same time by contacting the particles with a first gas the risk of flashback or premature ignition is much reduced.

The present invention also avoids the direct impingement of high speed particles upon the oxygen molecules. This is believed to be another reason for the improved safety of the present process and apparatus. It appears that the entrained first gas may initially form a gas sleeve or barrier between the high speed oxygen-rich gas and the walls of the outlet conduit. The introduced particles together with the first gas gradually merge into contact with the oxygen-rich gas as they pass towards the reaction zone. There is thus gradually increasing contact with oxygen-rich gas which reduces the risk of initiating combustion.

Compared with previous proposals to entrain the particles in a relatively inert gas, the use in the present invention of an oxygen-rich gas to entrain the particles permits the relative volume of inert gas to be minimised, thereby permitting delivery to the point of repair of a highly effective mixture of particles and oxygen-rich gas.

One possible reason for the success of the invention in achieving its aims may be that the first gas provides a gas coating layer, which can also be regarded as a lubricant, around the particle surfaces. This ensures that on coming into contact with the oxygen-rich aspirating stream the particles are protected against adverse frictional or abrasive effects such as collision with each other or with the sides of the equipment, which could otherwise result in localised heating or electrical charges causing premature initiation of the combustion.

While the benefits afforded by the invention are particularly marked at high specific flow rates, that is to say at high feed velocities, of particles and carrier gas, useful benefits are also obtained at lower specific feed rates. High specific flow rates may be obtained in feed lines of different diameters.

For convenience of operation it is generally preferred that refractory particles, for example in ceramic welding, are also introduced into the first gas. The refractory particles are thus similarly contacted with the first gas and aspirated into the entrainment zone.

It is advantageous to keep the flow rate of the first gas as low as possible consistent with achieving the required particle feed rate. This assists in ensuring that the particles and first gas are induced rather than forced into the oxygen-rich gas. It is especially important that the ratio of first gas to particles is not sufficient to permit fluidisation of the particles in the first gas. One preferred way of achieving the required relative flow ratio is to induce the flow of first gas and particles in a downwards direction into the entrainment zone and thereby utilise the effect of gravity in ensuring a high particle flow rate.

Another preferred feature to assist induced as distinct from forced particle flow is to ensure that the pressure of the first gas is not greater than atmospheric pressure.

The means of forcing the oxygen rich gas into the entrainment zone is preferably an injector nozzle, most desirably located in alignment with the combined outlet stream of particles, first gas and said oxygen rich gas from the entrainment zone. This permits a high velocity transmission of oxygen-rich gas through the entrainment zone and thereby enhances its aspiration effect. Its direction of flow through the entrainment zone relative to the first gas and particles should be chosen to enhance the aspiration, the preferred direction of flow being substantially horizontal.

The term "oxygen-rich" is used herein in relation to the aspirating gas to mean a gas containing more oxygen than air contains. In general it should preferably contain at least 60% oxygen by volume, and most preferably at least 75% oxygen by volume. The use of substantially pure oxygen is both permissible and convenient, subject always to appropriate safety features, since its use provides a very high proportion of oxygen in the gas reaching the reaction zone.

The pressure at which the oxygen rich gas is injected is preferably in the range 1.0 to 10.0 bar.

Although the addition of particles and first gas to the oxygen-rich gas occurs in the entrainment zone, full mixing of the different gases and particles does not necessarily take place at this point. More usually mixing of the different components continues in the lines leading from the entrainment zone to the reaction zone, giving a fully mixed feed to the reaction zone.

The first gas is preferably inert or relatively inert, that is to say any oxygen present is less than 18% by volume of the first gas. Examples of inert or relatively inert gases are nitrogen and carbon dioxide or mixtures of these possibly with other gases. A mixture of air and nitrogen is generally preferred. Since it is the first gas which effects the first contact with the particles, the presence of inert or relatively inert gas at this point ensures the prevention of premature combustion upstream of the entrainment zone. The inert or relatively inert gas also however dilutes the oxygen content of the carrier gas reaching the reaction zone and should accordingly not be present in either the first gas or oxygen-rich gas in such a proportion as to reduce the total oxygen content to below the level required for effective combustion in the reaction zone. Similarly the presence of the first gas protects newly entrained particles if they collide with walls of the apparatus, thereby reducing safety risks from localised heat generation or electrical charges at these points.

Subject to the combustion requirements and to the need to maintain the relative gas volumes and velocities at the point of mixing such that the desired aspiration is achieved, various other additions can be made to the gases. The combined streams can also be enriched with oxygen downstream of the point of mixing. Such additions are beneficial in giving a wide degree of control over the repair conditions. Indeed such is the improvement given by the use of a first gas for the particles that it is possible to contemplate the use of an oxygen-rich gas as the first gas, provided that proper safety precautions are followed in the upstream parts of the feed system where it is present.

The present invention extends to apparatus suitable for use in performing a process as defined herein and accordingly provides apparatus for repairing a refractory body which comprises means for projecting combustible particles in an oxygen-rich carrier gas against such body to cause oxidation of combustible particles in a reaction zone adjacent such body and thereby the generation of heat required for dressing such body or forming a refractory weld mass thereon, characterised in that the apparatus comprises an introduction zone for feeding the combustible particles into a first gas and an entrainment zone comprising entry means for oxygen-rich gas which gas produces an aspirating effect whereby a flow of the combustible particles and the first gas is induced into the entrainment zone and the induced combustible particles and first gas are carried along with said oxygen-rich gas through a conduit leading to said reaction zone.

The apparatus preferably includes a hopper to receive the particles and a feed means to convey the particles into the introduction zone, from whence they pass to the entrainment zone. The hopper is preferably located vertically above the conveyor. Means to seal the hopper and thereby allow a positive pressure over the particles therein may also desirably be present.

The feed means may for example be a metering device fitted with a rotating disc carrying scraper blades to promote even particle flow. The preferred feed means is a screw conveyor, the inlet and outlet for particles into and out of the screw conveyor being preferably located at a sufficient distance from each other to create a substantially even flow of particles into the introduction zone. The screw conveyor is preferably driven by a variable speed motor so as to give additional control over the operating conditions, especially of the particle: gas ratio in the first gas and in the comburent carrier gas.

The introduction zone is preferably a cylindrical vertical chamber, with the entrainment zone forming the lowermost part thereof. The feed means preferably leads into the side wall of the chamber above the entrainment zone. The inlet or inlets for the first gas into the chamber is or are preferably at or near the top such that the first gas passes vertically downwards through the chamber. At least one safety device is preferably included in the chamber or in a conduit attached thereto, so as to relieve any back pressure resulting from flashback or other premature combustion. One suitable example of safety device is a bursting disc having a defined pressure at which it will rupture. Another example is a spark containment chamber which directs any reaction to a safe exhaust site.

A conduit leads from the entrainment zone, preferably in direct alignment with the oxygen-rich gas introduction means to feed the particle plus gas mixture to the lance. Additional inlets can if required be included in this conduit for the introduction of additional gas, particularly of additional oxygen.

At least one guide for the particles and first gas, for example in the form of a frusto-conical member, is preferably included in the introduction zone to direct the particles and the first gas towards the oxygen-rich gas. The guide is desirably arranged to direct the particles to points at which they will most effectively be aspirated by the oxygen-rich gas.

Other factors in achieving the aspirating effect are the speed of flow of the oxygen-rich stream, the form of the inlet nozzle for the oxygen-rich stream and the dimensions and location of the inlet nozzle relative to the outlet orifice.

The aspirating action can in some circumstances cause an undue pressure reduction in the introduction zone, whereby the flow of particles and first gas to the oxygen-rich gas is reduced to below the desired level. In order to avoid this possibility the introduction zone can be provided with an opening to the atmosphere, thereby ensuring that the pressure in the introduction zone does not fall substantially below a satisfactory pressure. The opening thus provides a useful self regulating effect for the entrainment.

The conduit leading from the entrainment zone to the reaction zone preferably includes a divergent section. This section assists in effective merging and mixing of the particles and gases downstream of the entrainment zone and thus in ensuring that the components have been thoroughly mixed before reaching the reaction zone.

BRIEF DESCRIPTION OF THE DRAWING

A preferred embodiment of the invention is described below in greater detail with reference to the accompanying drawings in which.

DESCRIPTION OF THE PREFERRED EMBODIMENTS

Figure 1:
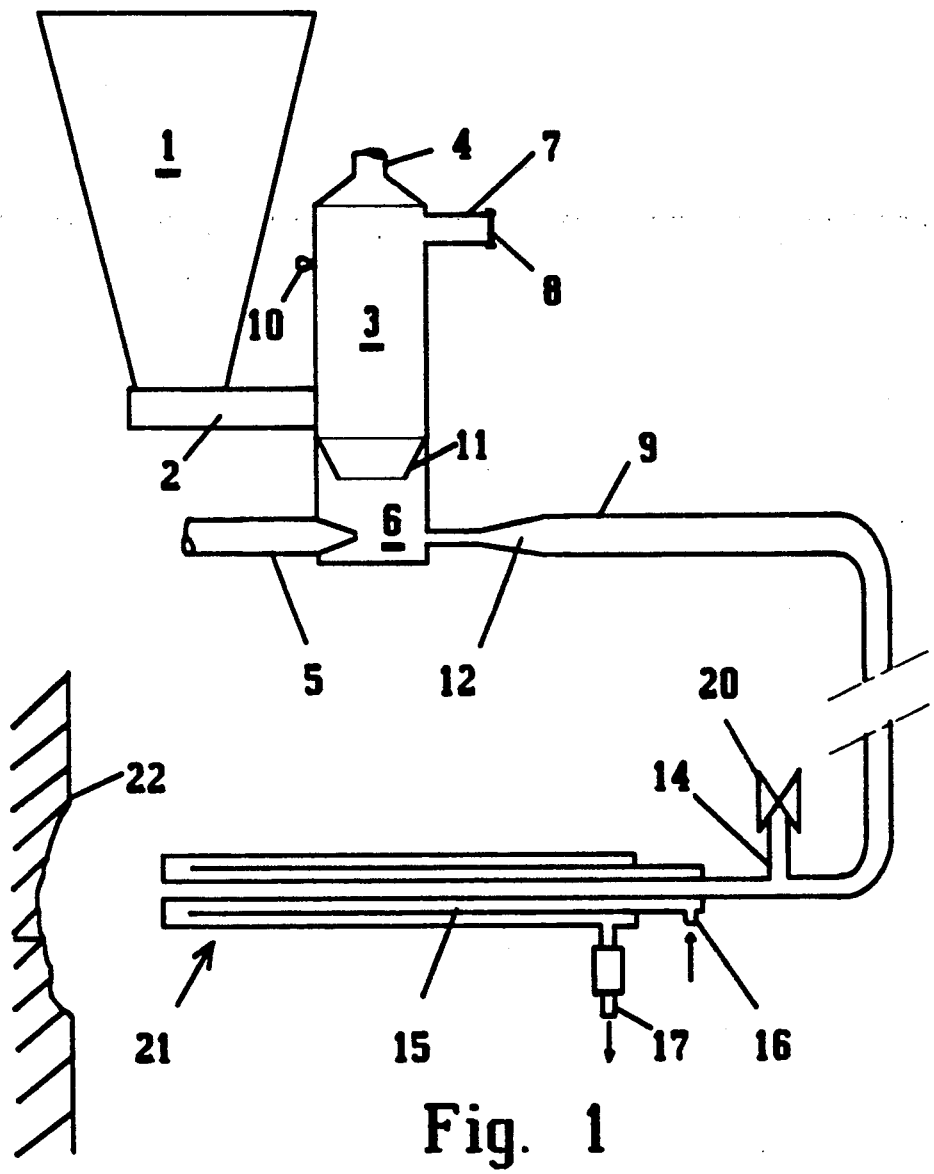
FIG. 1 is a diagrammatic view (not to scale) of a ceramic welding unit according to the invention and FIG. 2 is an enlarged view of the particle and gas feed section of the unit shown in FIG. 1.
Figure 2:
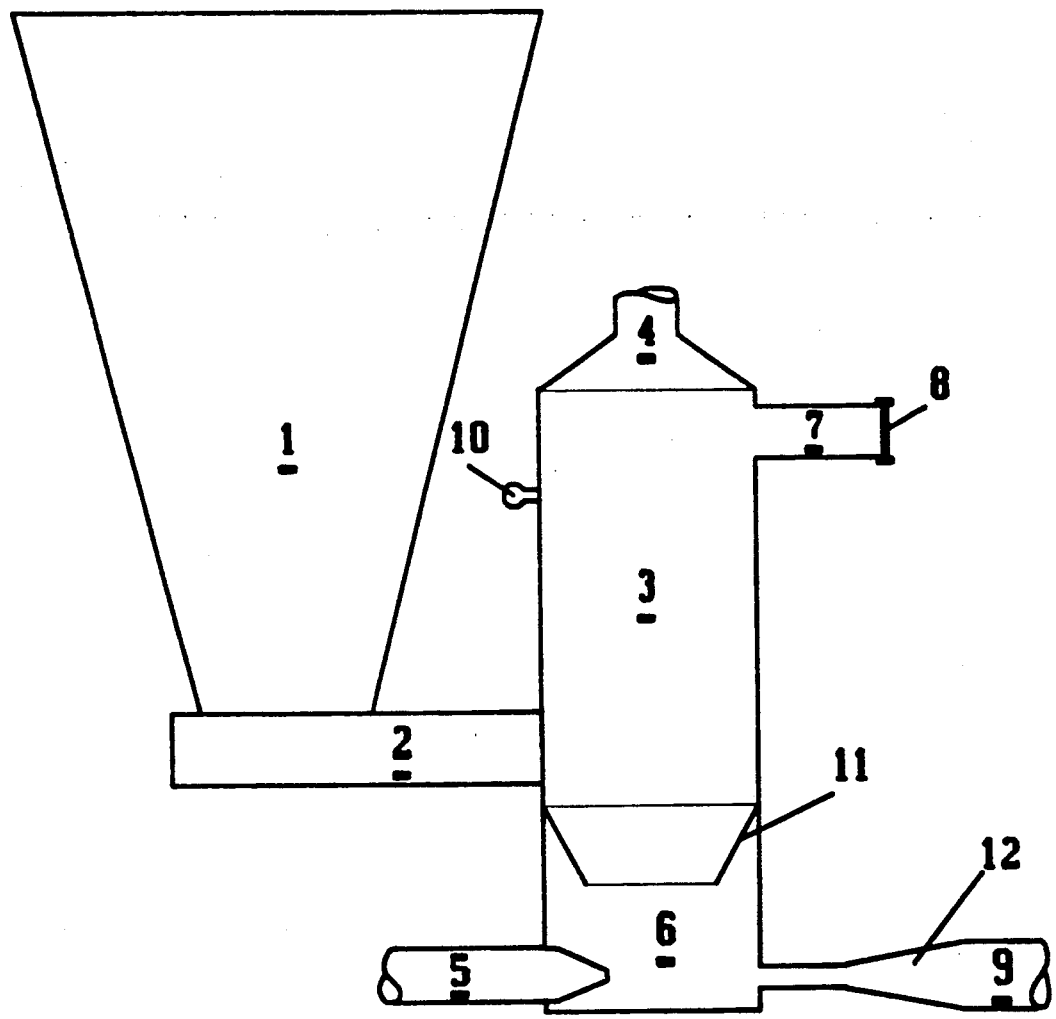

The unit comprises a feed hopper 1 for a screw conveyor 2 which is driven by a variable speed motor (not shown) and leads to an introduction chamber 3. A feed inlet 4 is provided in the chamber 3 for delivery of a first gas. An injection nozzle 5 for an oxygen rich gas leads into an entrainment zone 6 at the base of the chamber 3. An outlet conduit 9 leads from the entrainment zone 6 to a spray lance 21. In the upper part of the chamber 3 a conduit 7 is provided with a bursting disc 8 having a defined bursting pressure. A guide plate 11 in the shape of a downwardly converging conical section is disposed in the chamber 3 just above the entrainment zone 6. The outlet conduit 9 includes a divergent section 12 to encourage mixing of the particles and gases leaving the entrainment zone 6 and has an additional inlet 14 at the butt end of the lance 21 to allow for introduction of additional oxygen or other gas through valve 20.

A manometer 10 is also disposed in the upper part of the chamber 3 so as to detect any abnormal pressure change.

The lance 21 is enclosed within a water jacket 15 having water inlet and outlet ports 16 and 17 respectively.

In operation a mixture of particles to be sprayed is fed to the hopper 1 and conveyed by the screw 2 to the chamber 3 and thence towards the entrainment zone 6. A stream of nitrogen is introduced into the chamber 3 through inlet 4 as a first contact gas for the particles. It passes downwardly through the chamber 3 and together with the particles is directed by the guide 11 to the centre of the entrainment zone 6. A stream of oxygen under pressure is injected into the entrainment zone 6 through the nozzle 5 and draws in particles and first gas from the chamber 3. The particles thus enter the entrainment zone under the combined effects of gravity and the aspiration caused by the oxygen stream. The combined stream of gas and particles thus created is conveyed to the lance.

Typical dimensions within the feed section are a diameter of 100 mm for the contact zone 3, an internal diameter of 10 mm for the oxygen-rich gas nozzle, and an internal diameter of 30 mm diverging to 50 mm for the outlet from the entrainment zone.

Various examples of the invention now follow.

EXAMPLE 1

In order to compensate for wear of furnace wall blocks (22 in FIG. 1) of electrocast CORHART ZAC (Trade Mark), made of zirconia, alumina and silica, a coating was formed on the wall, which was at a temperature of about 1200° C., by deposition of a particle mixture delivered in a carrier gas through a lance. The particle mixture was composed of 35% by weight of zirconia and 53% by weight of alumina in admixture with silicon and aluminium, the silicon content of the mixture being 8% and the aluminium content being 4%.

The alumina and zirconia particles had a grain size between 50 μms and 500 μms and the particles of silicon and aluminium each had an average grain size below 10 μms, the silicon having a specific surface of 4000 cm2/g and the aluminium a specific surface of 6000 cm2/g.

The particle mixture was introduced into the hopper 1 from where it was conveyed to the chamber 3 by the screw means 2. The speed of rotation of the screw means 2 was chosen so as to deliver the particles at 600 kg/hour. Nitrogen was introduced through the inlet 4 as the first gas at 43 Nm 3/hr. The particles were conveyed in the thus created nitrogen stream and passed to the entrainment zone 6. Oxygen was introduced through the injector 5 at 280 Nm 3/hr under a relative pressure of 7.2 bar. The nitrogen and the particles were mixed with the oxygen by the aspirating effect of the oxygen stream.

In this particular example the bursting disc 8 was absent and the conduit 7 therefore allowed the free entry of air. It was determined that an average of 102 Nm3/hr of air at atmospheric pressure entered in this way.

Supplementary oxygen for the lance 21 was added through a further inlet point (not shown in the drawing) at a rate of 280 Nm3/hr at a relative pressure of 8.1 bar. The further inlet point was located at the end of the lance. The lance was of a telescopic type with a length of 12 meters when fully extended and was mounted on a self-propelled carriage (not shown) which could be correctly aligned to effect the repair of a furnace wall 22.

The introduction of particles into the first gas and its intimate admixture and effective carriage with the oxygen gave an excellent consistency of combustion and resulted in the formation of a high quality refractory mass, with a very high rate of deposition on the furnace wall 22 and little risk of combustion within the feed conduit.

EXAMPLE 2

For the repair of fissures in a furnace wall formed of blocks of silica, principally in the tridymite form, a particle mixture was employed composed of 87% silica, 12% silicon and 1% aluminium (percentages by weight). The silica employed was constituted of 3 parts of cristoballite and 2 parts of tridymite (by weight) with grain sizes between 100 μm and 2 mm. The silicon and aluminum particles each had an average grain size below 10 μms, the silicon having a specific surface of 4000 cm2/g and the aluminum of 6000 cm2/g. The repair was effected with the furnace wall at a temperature of about 1150° C. In the same way as in example 1, the particle mixture was introduced into the hopper 1 from where it was conveyed to the introduction chamber 3 by the screw conveyor 2. The speed of rotation of the screw was chosen so as to deliver the particles at 600 kg/hr. In this example however the bursting disc 8 was in place so as to prevent the entry of free air through the conduit 7 while ensuring a safety vent in case of an internal explosion. The hopper was similarly hermetically sealed and was kept under pressure by means of a gas supply. Because of its local availability nitrogen was chosen as this gas. The hopper 1 was held at a relative pressure of 2 bar.

In this example nitrogen was introduced through the inlet 4 at a rate of 125 Nm3/hr. As in example 1, the injector 5 delivered oxygen to the entrainment zone 6 at 280 Nm3/hr and a relative pressure of 7.2 bar.

Supplementary oxygen was also introduced at the butt end of the lance at a rate of 2800 Nm3/hr and a relative pressure of 8.1 bar. Excellent results were again obtained in quality and rate of coating.

EXAMPLE 3

In order to repair the walls (of basic refractory blocks) of a ladle for molten metal exposed to high rates of wear, there was deposited on the walls, at a temperature of 1000° C., a particle mixture composed of 92% magnesium oxide, 4% silicon and 4% aluminium (percentages by weight) delivered in a carrier gas through a lance.

The magnesium oxide has a grain size in the range 100 μms to 2 mm. The silicon and aluminium particles each had an average grain size below 10 μms, the silicon having a specific surface of 4000 cm2/g and the aluminium a specific surface of 6000 cm2/g. This mixture was introduced into the chamber 3 in the same manner as in Example 1 except that the speed of rotation of the screw conveyor 2 was chosen to deliver 1000 kg/hr. The first gas was composed of nitrogen delivered at a rate of 140 Nm3/hr. The injector 5 delivered 140 Nm3/hr of oxygen at a relative pressure of 6.4 bar. Just as in Example 2 a bursting disc 8 closed the conduit 7 and the hopper 1 was held under a pressure of 1.5 bar of nitrogen.

Supplementary oxygen was introduced into the feed conduit at the butt end of the lance at a rate of 140 Nm3/hr.

The coating thus formed remained in place for 20 consecutive melts of the metal and it proved easily possible to effect the repair within the time period between two consecutive melts.

In a variation of this example the oxygen flow to the entrainment zone was increased and the addition of oxygen to the lance was omitted.

What is claimed is:

1. Apparatus for repairing a refractory body, comprising:

means for projecting a particle mixture comprising combustible particles in an oxygen-rich carrier gas against a refractory body to cause oxidation of the combustible particles in a reaction zone adjacent the refractory body and thereby the generation of heat required for one of dressing the refractory body and forming a refractory weld mass thereon;

a chamber including an introduction zone and comprising respective entry means for admitting a flow of a first gas and for feeding the combustible particles into the introduction zone; and an entrainment zone in communication with the introduction zone and comprising entry means for admitting a flow of oxygen-rich gas thereinto and exit means including a conduit which leads from the entrainment zone to the reaction zone, which flow of oxygen-rich gas produces an aspirating effect in the entrainment zone as it passes through the entrainment zone and exits the entrainment zone through the conduit whereby a flow of the combustible particles and the first gas is induced by aspiration from the introduction zone into the entrainment zone and the induced flow of combustible particles and first gas is entrained in and carried along with the flow of the oxygen-rich gas as the flow of oxygen-rich gas exits the entrainment zone.

2. The apparatus as claimed in claim 1, further comprising a hopper for particles to be introduced into the first gas.

3. The apparatus as claimed in claim 2, wherein the hopper is provided with gas sealing means.

4. The apparatus as claimed in claim 1, further comprising a conveyor to take particles to the introduction zone.

5. The apparatus as claimed in claim 4, wherein the conveyor is a screw conveyor.

6. The apparatus as claimed in claim 5, wherein the screw conveyor has a particle inlet and a particle outlet located at a distance from each other sufficient to create a substantially even flow of particles into the introduction zone.

7. The apparatus as claimed in claim 4, wherein the conveyor is driven by a variable speed motor.

8. The apparatus as claimed in claim 1, wherein the introduction zone is located above the entrainment zone.

9. Apparatus as claimed in claim 8, wherein the chamber including the introduction zone is a cylindrical vertical chamber having a lowermost part, and wherein the lowermost part of the cylindrical vertical chamber defines the entrainment zone.

10. The apparatus as claimed in claim 9, wherein the cylindrical vertical chamber has a side wall in which is defined at least one orifice positioned above the entrainment zone, and wherein combustible particles enter the introduction zone through the at least one orifice.

11. The apparatus as claimed in claim 9, wherein the cylindrical vertical chamber has a top part, and wherein at least one inlet for the first gas is provided at or near the top part of the cylindrical vertical chamber.

12. The apparatus as claimed in claim 1, wherein the introduction zone includes a guide to direct the combustible particles and the first gas to the entrainment zone.

13. The apparatus as claimed in claim 1, wherein the entry means for the flow of oxygen-rich gas into the entrainment zone is a nozzle.

14. The apparatus as claimed in claim 1, the entry means for the flow of oxygen-rich gas into the entrainment zone is aligned in a substantially horizontal direction.

15. The apparatus as claimed in claim 1, wherein the conduit leading from the entrainment zone to the reaction zone has an upstream end, and wherein the entry means for the flow of oxygen-rich gas into the entrainment zone is aligned with the upstream end of the conduit.

16. The apparatus as claimed in claim 1, wherein the introduction zone includes a safety bursting disc.

17. The apparatus as claimed in claim 1, wherein the conduit leading from the entrainment zone to the reaction zone includes a divergent section.

18. The apparatus as claimed in claim 1, wherein the introduction zone has defined therein an opening to ambient atmosphere.

19. The apparatus as claimed in claim 1, wherein the conduit leading from the entrainment zone to the reaction zone includes a plurality of gas inlets.

* * * * *